United States Patent [19]

Kirsch et al.

[11] 4,187,051
[45] Feb. 5, 1980

[54] ROTARY VIDEO ARTICLE CENTERING, ORIENTING AND TRANSFER DEVICE FOR COMPUTERIZED ELECTRONIC OPERATING SYSTEMS

[76] Inventors: Jerry Kirsch; Kerry F. Kirsch, both of 36 Beacon Hill, Grosse Pointe Farms, Mich. 48236

[21] Appl. No.: 910,136

[22] Filed: May 26, 1978

[51] Int. Cl.$^2$ .............................................. B25J 9/00
[52] U.S. Cl. ................................. 414/744; 318/640; 364/478; 364/513; 414/750
[58] Field of Search .................... 214/1 BC, 1 CM; 318/640; 364/513, 478; 356/152, 400; 340/146.3 H; 414/744, 750

[56] References Cited

U.S. PATENT DOCUMENTS

| | | | |
|---|---|---|---|
| 2,696,565 | 12/1954 | Shockley | 318/640 |
| 3,406,837 | 10/1968 | Kirsch et al. | |
| 3,777,902 | 12/1973 | Potter | |
| 3,804,270 | 4/1974 | Michaud et al. | |
| 3,888,362 | 6/1975 | Fletcher et al. | 318/640 |
| 3,986,007 | 10/1976 | Ruoff | 364/513 |
| 4,017,721 | 4/1977 | Michaud | |

FOREIGN PATENT DOCUMENTS 2549898  5/1977  Fed. Rep. of Germany .

*Primary Examiner*—L. J. Paperner
*Attorney, Agent, or Firm*—Willis Bugbee

[57] ABSTRACT

Mounted upon a servo-motor-driven longitudinally-reciprocable X-axis carriage is a servo-motor-driven laterally-reciprocable Y-axis carriage carrying an air cylinder with a vertically-reciprocable and rotatable piston rod. Mounted atop the piston rod is a fixed horizontal arm carrying a rotary actuator and a reciprocating motor respectively rotating and reciprocating a movable horizontal arm mounted on the fixed arm. Also mounted on said fixed arm and rotatable by a stepping motor is a horizontal narrow-angle video camera with high resolving power. An inclined reflector mounted on the outer end of said movable arm reflects into the horizontal camera light rays from articles underneath on a work carrier. A stationary vertical overhead wide angle video camera of lower resolving power is fixedly mounted above said work carrier and focussed thereupon.

Mounted on said movable arm behind said reflector is an article-gripper stepping motor arranged to rotate, upon a vertical axis, a depending article gripper having gripping fingers operated by an air cylinder mounted on said movable arm. A modification replaces both cameras by a single vertical overhead video camera mounted on and rotated by a stepping motor upon a servo-motor-driven laterally-reciprocable Y-axis carriage which in turn is mounted upon a servo-motor-driven longitudinally-reciprocable X-axis carriage above the work carrier. The computerized electronic operating system for this device involves conventional components and is described below.

12 Claims, 20 Drawing Figures

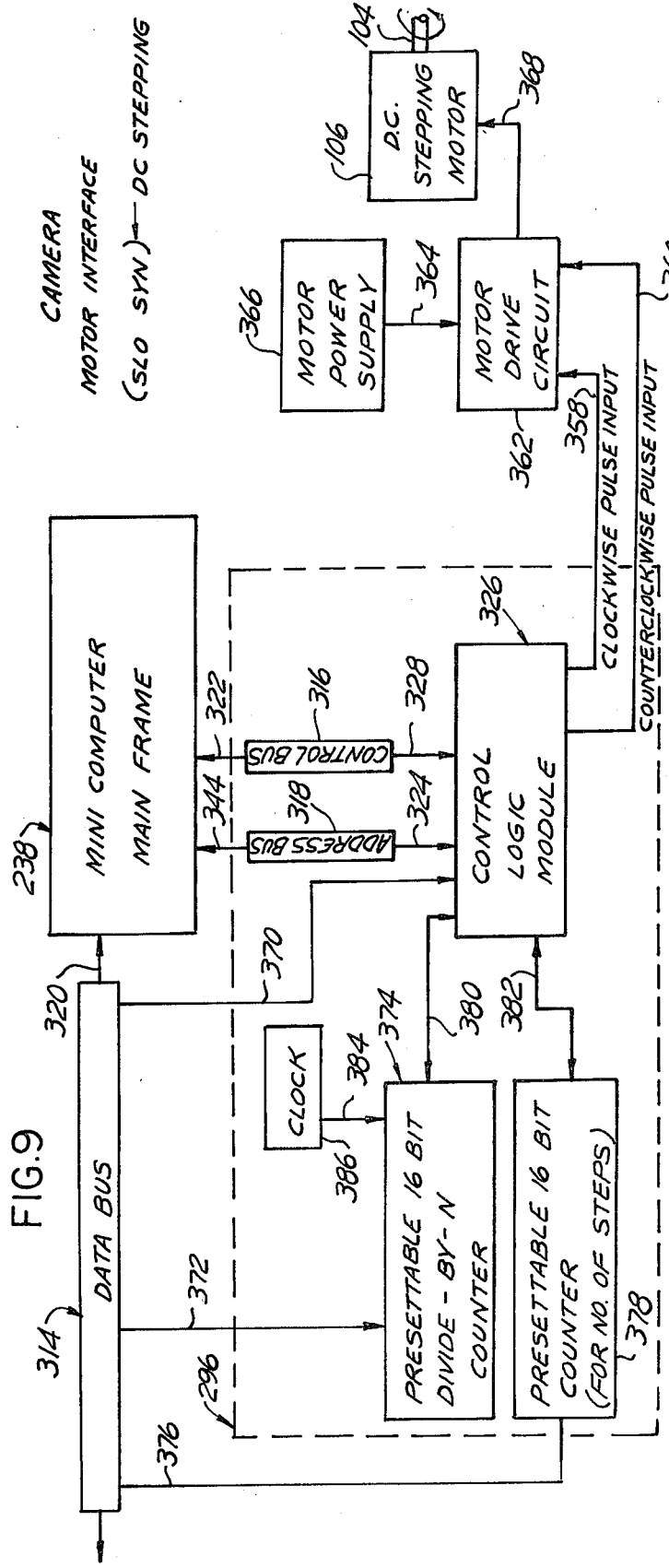
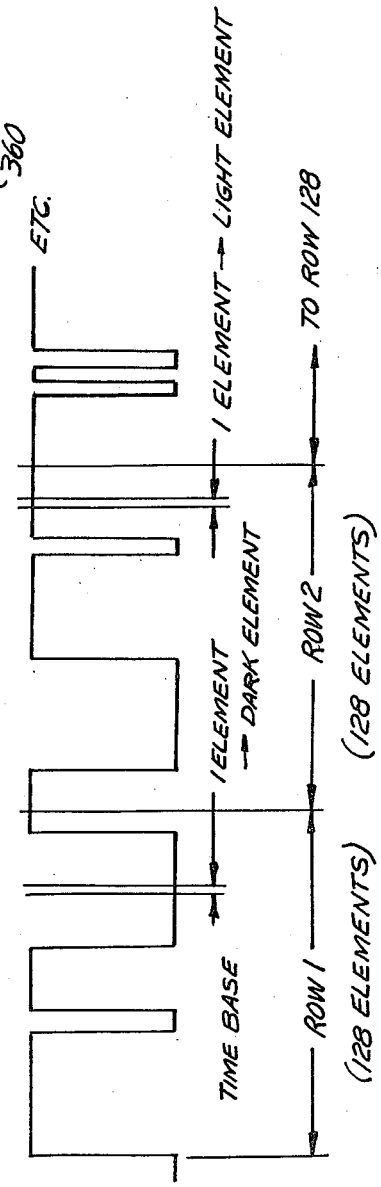
FIG. 9
FIG. 18

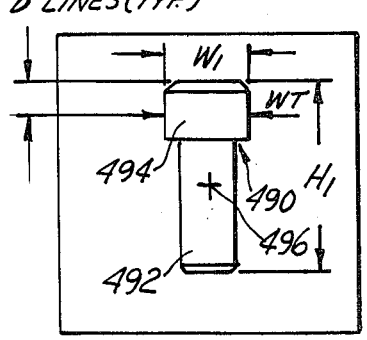
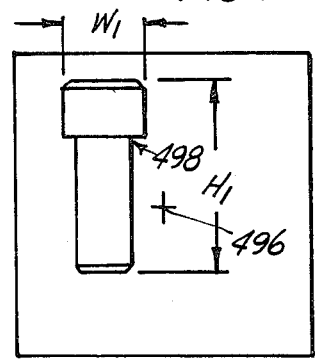
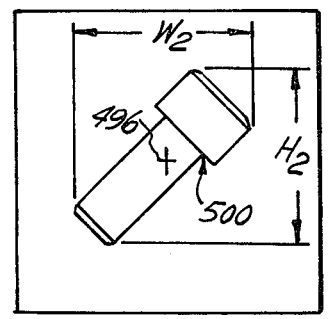
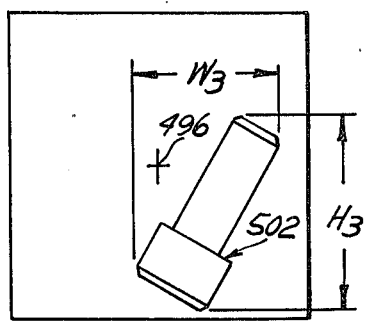
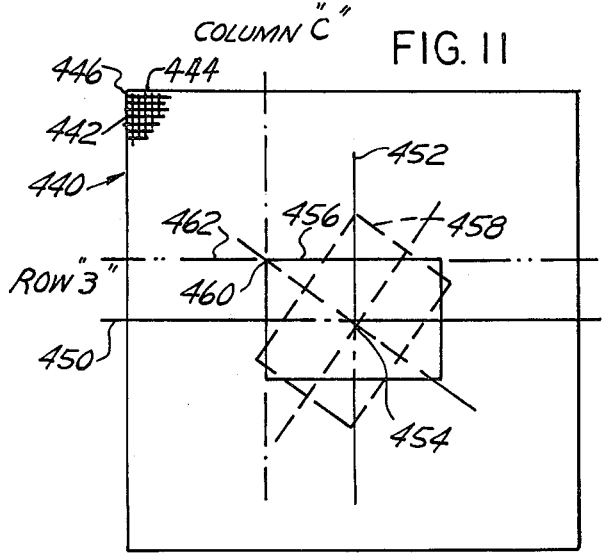
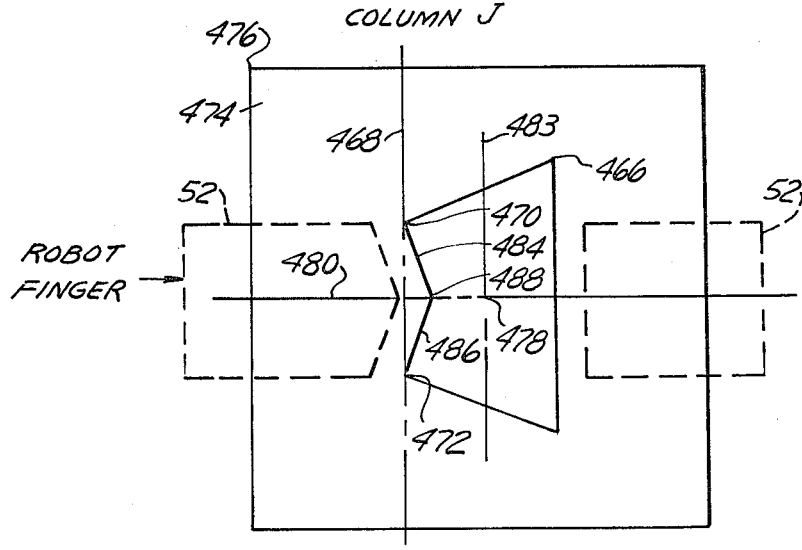

ROTARY VIDEO ARTICLE CENTERING, ORIENTING AND TRANSFER DEVICE FOR COMPUTERIZED ELECTRONIC OPERATING SYSTEMS

BACKGROUND OF THE INVENTION

Hitherto, article handling devices or robots, as they are frequently termed, have contained lifting and swinging motors carrying mechanically-operated extensible arms with workpiece grippers mounted thereon for transferring articles from one location to another, such as for serving production machines. Such devices have been limited in their applicability by the fact that they are blind, in that they are useful only where their mechanism can be programmed to feel the article to be picked up or to be accurately limited in its motions for picking up such articles, and in the orientation thereof. Where a video camera has been incorporated in computerized automation devices, its fixed position has required the computer to perform complex trigonometric computations to determine the precise locations and orientations of such articles.

SUMMARY OF THE INVENTION

The present invention provides an article centering, orienting and transfer device which includes in its circuitry and mechanism a video camera along with camera-rotating mechanism coupled with motor-driven positioning devices for positioning the camera relatively to the X-axis and Y-axis of an article carrier or conveyor.

The rotation of the video camera in the present invention eliminates a complex action of trigonometric computation by the computer in otherwise determining the precise location, centration and orientation of the article and in transferring it, properly oriented, to the production machine or other destination of article delivery. The present invention particularly resides in the combination of the rotatable video camera mounted on a vertically, longitudinally and laterally movable rotary workpiece-gripping, reach and turnover attachment and in the subcombination of the rotary video camera itself. It also resides in the wide angle overhead video camera as a finder for the rotatably narrow angle high resolving power video camera. It further resides in a modification wherein the overhead video camera is rotatable around a vertical axis and optionally equipped with a zoom lens, preferably adjusted by an electric motor.

In the drawings,

FIG. 9 is a block subdiagram of the video camera rotating motor interface shown obliquely above and to the right of the video interface in FIG. 7;

FIG. 11 is a diagrammatic view of the image in the image plane of the video camera, of a rectangular article before and after its proper orientation by comparison with the standard image in the memory section of the minicomputer, before and after rotation of the video camera in response to said image comparison;

FIG. 12 is a diagrammatic top plan view of the properly-oriented video camera image of a Vee-block about to be grasped by the also properly-oriented article gripper in the lower left-hand middle portion of FIG. 1;

FIG. 13 is a diagrammatic view of the video camera image of a screw properly oriented and contered;

FIG. 14 is a view similar to FIG. 13 of the video camera image or screw which is properly oriented but not centered;

FIG. 15 is a view of the same screw of FIGS. 13 and 14 which is centered but not properly oriented;

FIG. 16 is a view of the same screw which is neither centered nor properly oriented;

FIG. 17 is a graphical view illustrating the analog output of the horizontal video camera in FIGS. 1 and 7;

FIG. 18 is a graphical view illustrating the output of the analog-to-digital converter after conversion of the analog output from the horizontal video camera as shown in FIG. 17;

Figure 20:
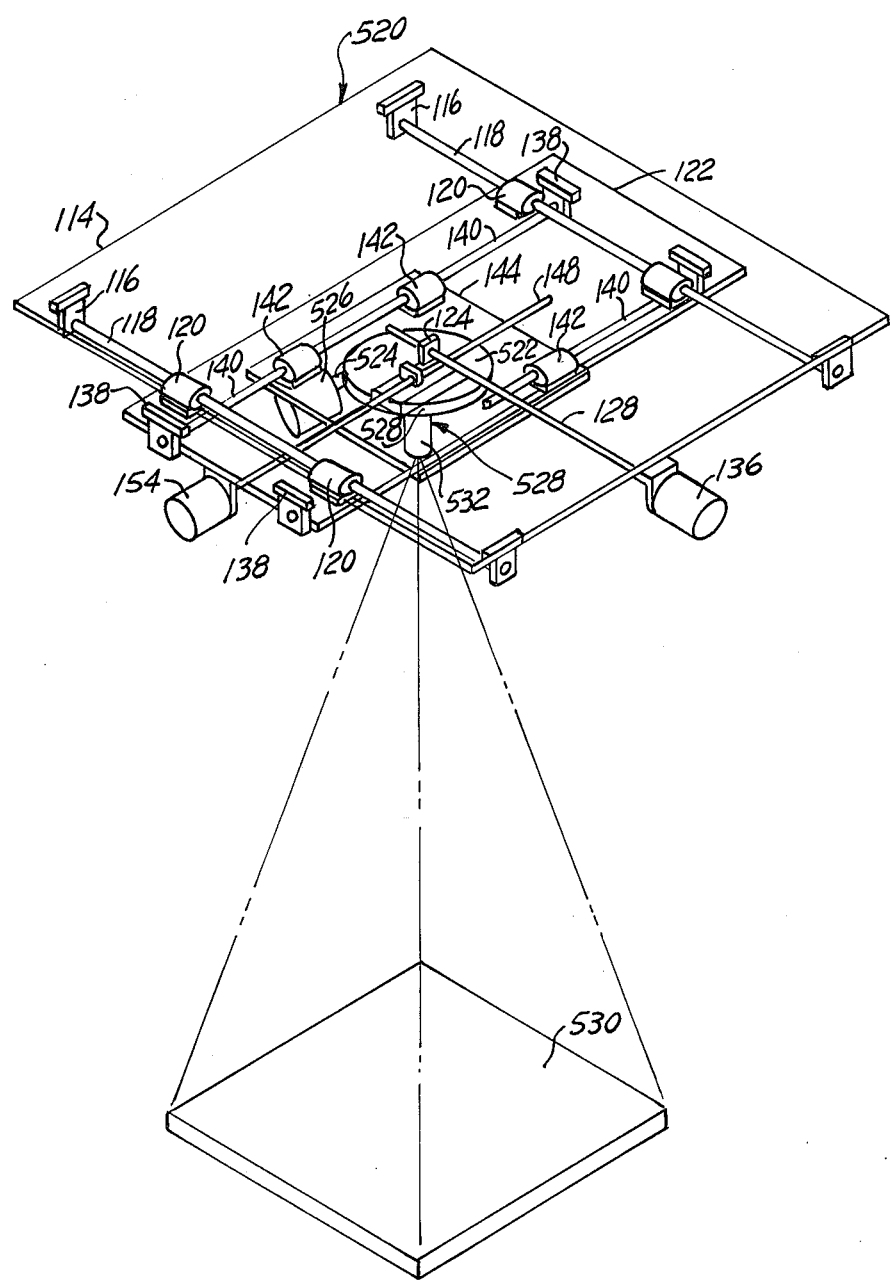

FIG. 19 is a view of the numerical array in the minicomputer memory section corresponding to the array of picture elements in the horizontal video camera as shown in a video monitor; and FIG. 20 is a phantom perspective view of a modified rotary video article centering, orienting and transfer device, and employing a rotary overhead video camera mounted on an X-Y positioner, according to another form of the invention, particularly adapted for use with large workpieces, with its supporting structure omitted to avoid the otherwise concealment thereby of working parts and partly broken away.

Figure 5:
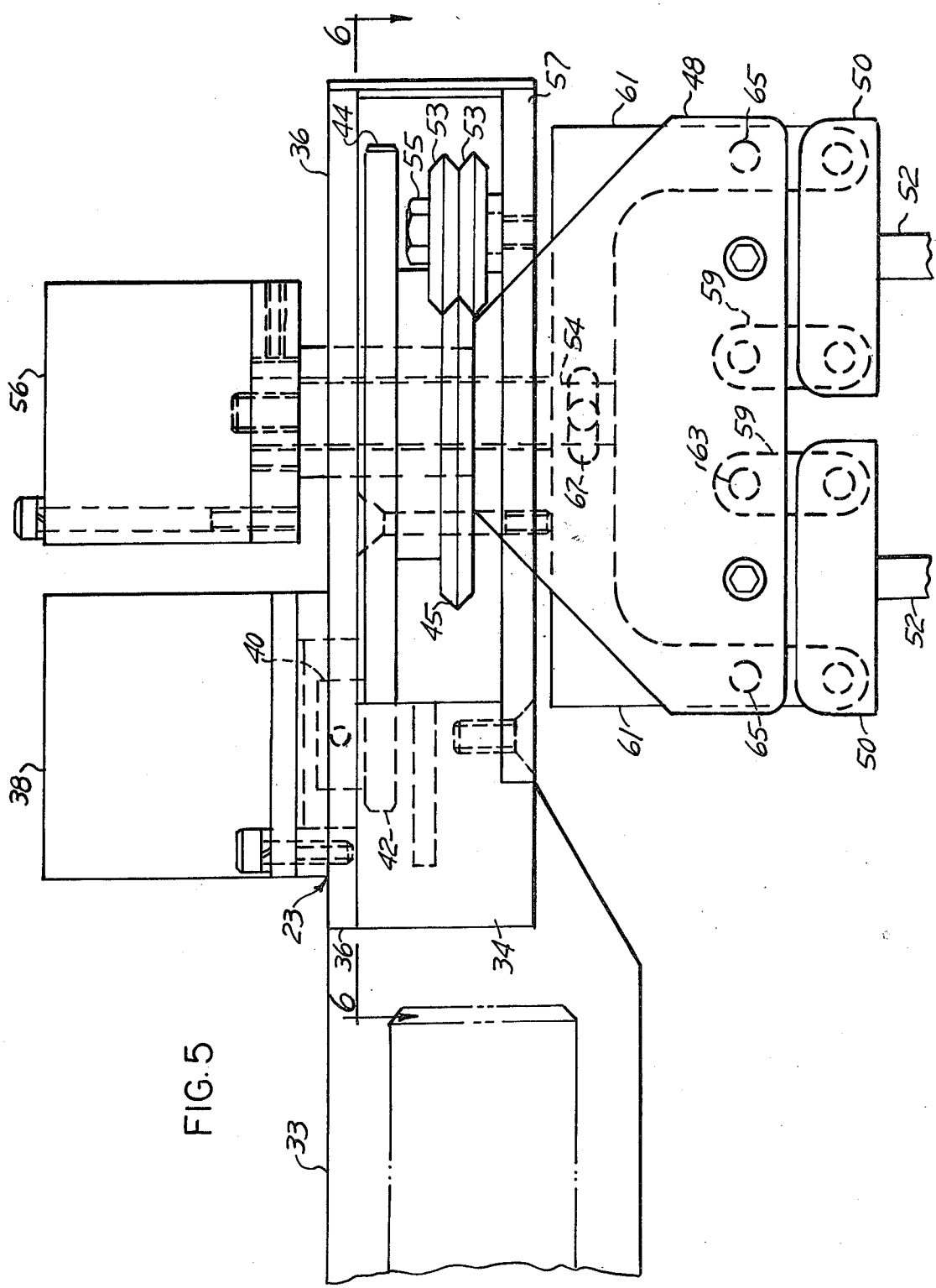
FIG. 5 is an enlarged side elevation, partly broken away, of the article gripper mechanism shown at the left-hand end of FIG. 1 and in the lower half of FIG. 4.
Figure 6:
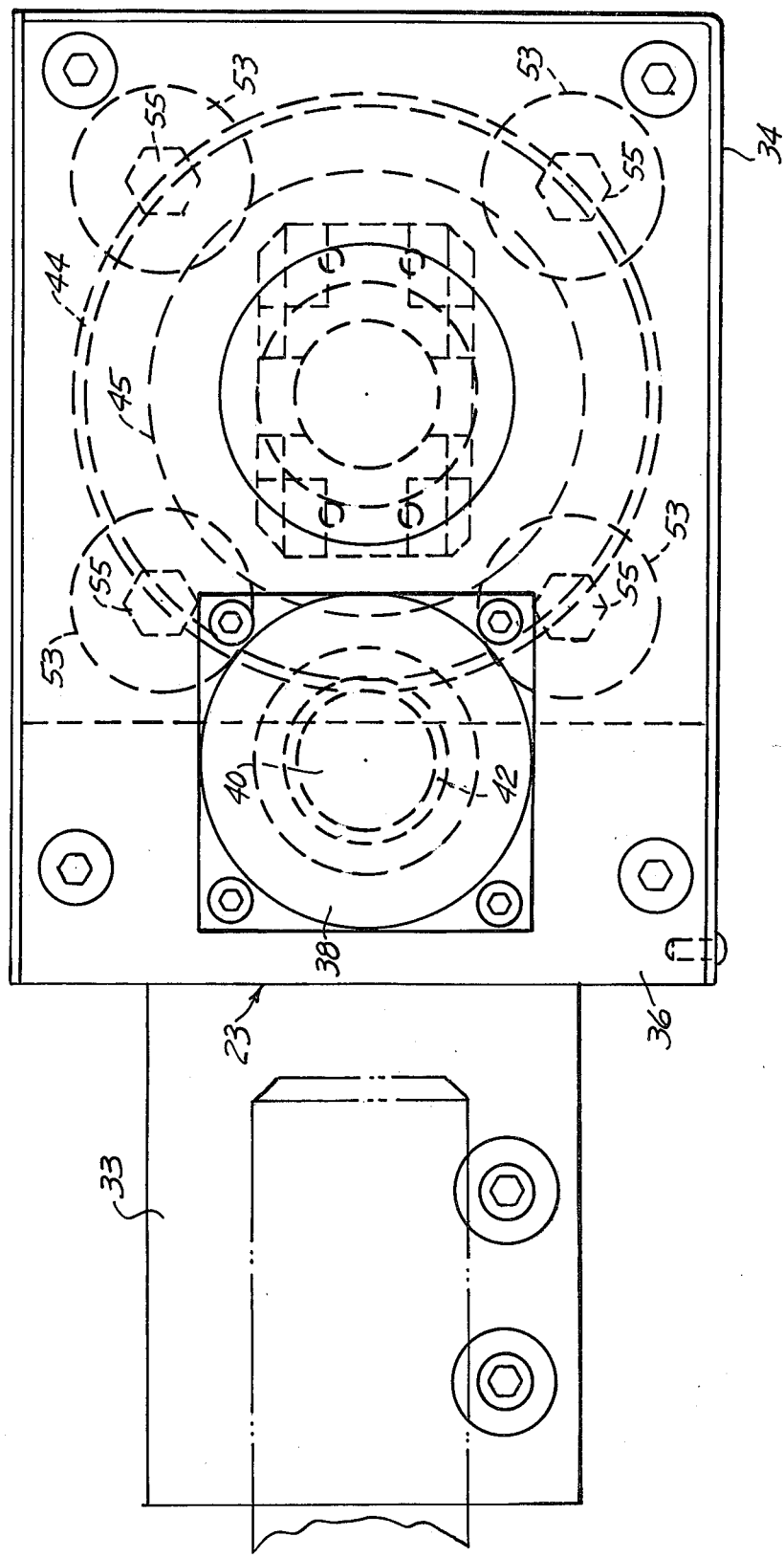
FIG. 6 is an enlarged horizontal section, taken along the line 6—6 in FIG. 5.

Referring to the drawings in detail, FIGS. 1 to 6 inclusive show a rotary video article centering, orienting and transfer device, generally designated 20, according to one form of the invention as consisting generally of a stationary vertical overhead video camera unit 21, a rotatable horizontal video camera unit 22 mounted on an article pickup and transfer attachment or robot 24 generally similar to that disclosed in the Potter U.S. Pat. No. 3,777,902 issued Dec. 11, 1973 for Workpiece-gripping reach and turnover attachment, but with a rotatable article gripper 23 therein of different construction as shown in FIGS. 5 and 6 herein. For a detailed description of the attachment 24, reference is made to said Potter patent. The article pickup and transfer attachment 24 is mounted upon a head 31 on the upper end of the output shaft 25 of a lifting and swinging article transfer device 26 generally similar to that disclosed in the Kirsch and Robb U.S. Pat. No. 3,406,837 issued Oct. 22, 1968 for Lifting and swinging work transfer device. For a detailed description of the device 26, reference is made to said Kirsch and Robb patent. The lifting and swinging device 26 is mounted on and movable bodily by an X-Y axis positioner, generally designated 27 described below.

The article transfer device or attachment 24 herein (FIG. 1) has a tubular fixed arm 28, the forward end of which is fixedly mounted on a hollow housing 29 secured to the head 31. Mounted on the rearward end of the fixed arm 28 is a fluid-operated rotary actuator 30 operatively connected to the rearward end of a rotatable and reciprocable output shaft or extensible arm 32 within the tubular fixed arm 28 and capable of being advanced and retracted relatively thereto by fluid-operated means contained within a cylinder 29a (FIG. 3) secured to and containing a piston head 29b on a piston rod 29c connected to a drag link 41, as well as capable of being turning around its axis of rotation by the rotary actuator 30.

The rotary actuator 30 is made and sold by Roto Actuator Corporation, 23919 Little Mack Avenue, St. Clair Shores, Mich. under the trademark TORKMOR and is conventional. Briefly described, it consists of forward and rearward heads 31a and 33a held against the opposite ends of a cylinder 35 by strain rods 37. The cylinder 35 contains a turning vane (not shown) operatively connected to the rotatable and reciprocable output shaft 32. The latter passes rotatably through the drag link 41 which moves it to and fro in response to the reciprocation of the piston rod 29c while guided by a guide rod 43 which passes through the housing 29 in accordance with the said Potter U.S. Pat. No. 3,777,902 of Dec. 11, 1972. The guide rod 43 passes through the housing 29 and through a guide arm 47 integral with the forward head 31a. Forward and rearward fittings 49 and 51 respectively conduct fluid to and from the cylinder 35.

Figure 1:
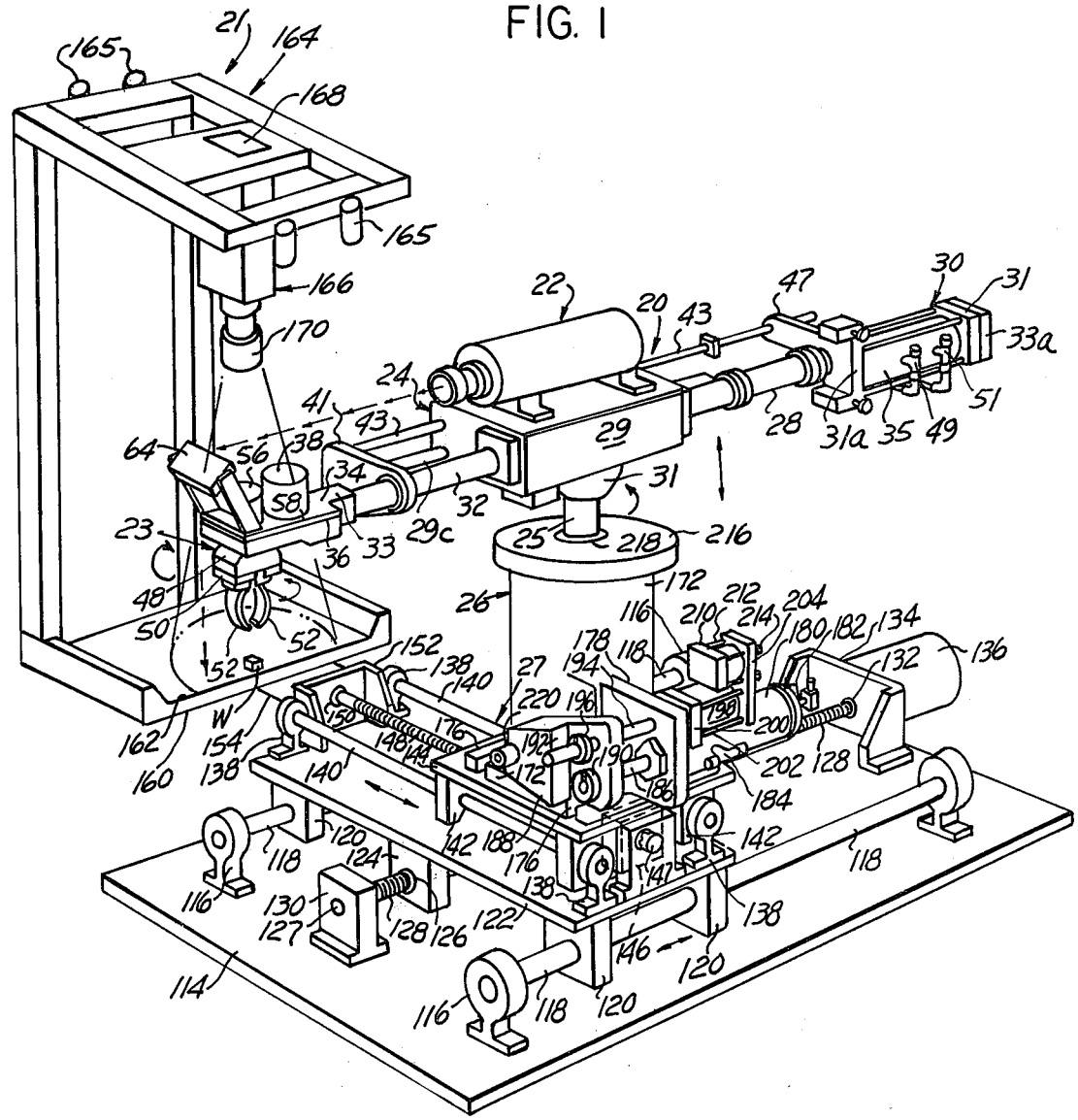
FIG. 1 is a perspective view of the rotary video article centering, orienting and transfer device according to one form of the invention.

Mounted on the forward end of the rotatable and reciprocable output shaft or extensible arm 32 is the stem 33 of the hollow casing 34 of the rotary article gripper 23. The latter has an upper cover plate 36 on which is mounted an electrical gripper-rotating stepping motor 38 (FIGS. 1, 5 and 6). The stepping motor 38 has a downwardly-projecting output shaft 40 carrying a pinion 42 meshing with a gear 44, the hollow hub 46 of which extends downward into a driving connection with a rotary gripper head 48 journalled in the hollow casing 34. Drivingly secured to the hollow hub 46 is a bevel-edged annular gripper-head-supporting pulley 45 which is rotatably supported by four pairs of bevel-edged loose pulleys 53 which in turn are rotationally supported on pivot bolts 55 threaded into the correspondingly-threaded and bored bottom plate 57 of the casing 34. Suspended by parallel links 59 and parallel bell-crank levers 61 from inner pivots 63 and outer pivots 65 respectively in the rotary gripper head 48 are the hubs 50 of article-gripping fingers or jaws 52. The latter are moved to and fro by a pin-and-slot connection 67 between the upper ends of the bellcrank levers 61 and the piston rods 54 of a reciprocatory fluid pressure motor 56 mounted on the cover plate 36 of the casing 34. In this manner, the respective gripping fingers are moved toward and away from one another to respectively grip to release an article W, such as a workpiece held therebetween.

Mounted on the outer end of the hollow casing 34 (FIGS. 1 and 4) are two upwardly-and-outwardly-inclined bracket arms 58 which are bolted or otherwise fixedly secured to the upper surface 36 of the hollow casing 34 in spaced parallel relationship and bored in alignment at their upper ends to receive coaxial pivot pins 60 protruding laterally from a reflector mount 62 to which a reflector 64, such as a mirror, is adjustably secured.

Fixedly mounted on the hollow housing 29 on top of the article pickup and transfer device 24 is a hollow cylindrical outer video camera casing 74 of the rotatable video camera unit or assembly 22. Journalled in the side wall 78 of the outer video camera casing 74 (FIG. 2) as by coaxial longitudinally spaced anti-friction bearings 80 and 82 is an inner cylindrical video camera casing 84 within which is coaxially mounted a narrow-field high-resolution video camera, generally designated 86, and consisting generally of a video camera body 88 to the forward end of which is connected a video camera lens 90 of a focal length selected by the optical formula: focal length=(image size×object distance/object size). The video camera 86 which has been successfully used in the present invention is commercially available as the solid state automation video camera model TN 2200 made by General Electric Company of Syracuse, New York. As supplied to and successfully used in the present invention, the camera body 88 contains in the focal plane of the lens 90 a square picture element array (not shown) having 128 parallel horizontal rows of picture elements (commonly referred to as pixels) arranged in 128 vertical columns for a total of 16384 such picture elements disposed in an area approximately one-quarter (0.23) inch or 5.85 millimeters square.

Figure 2:
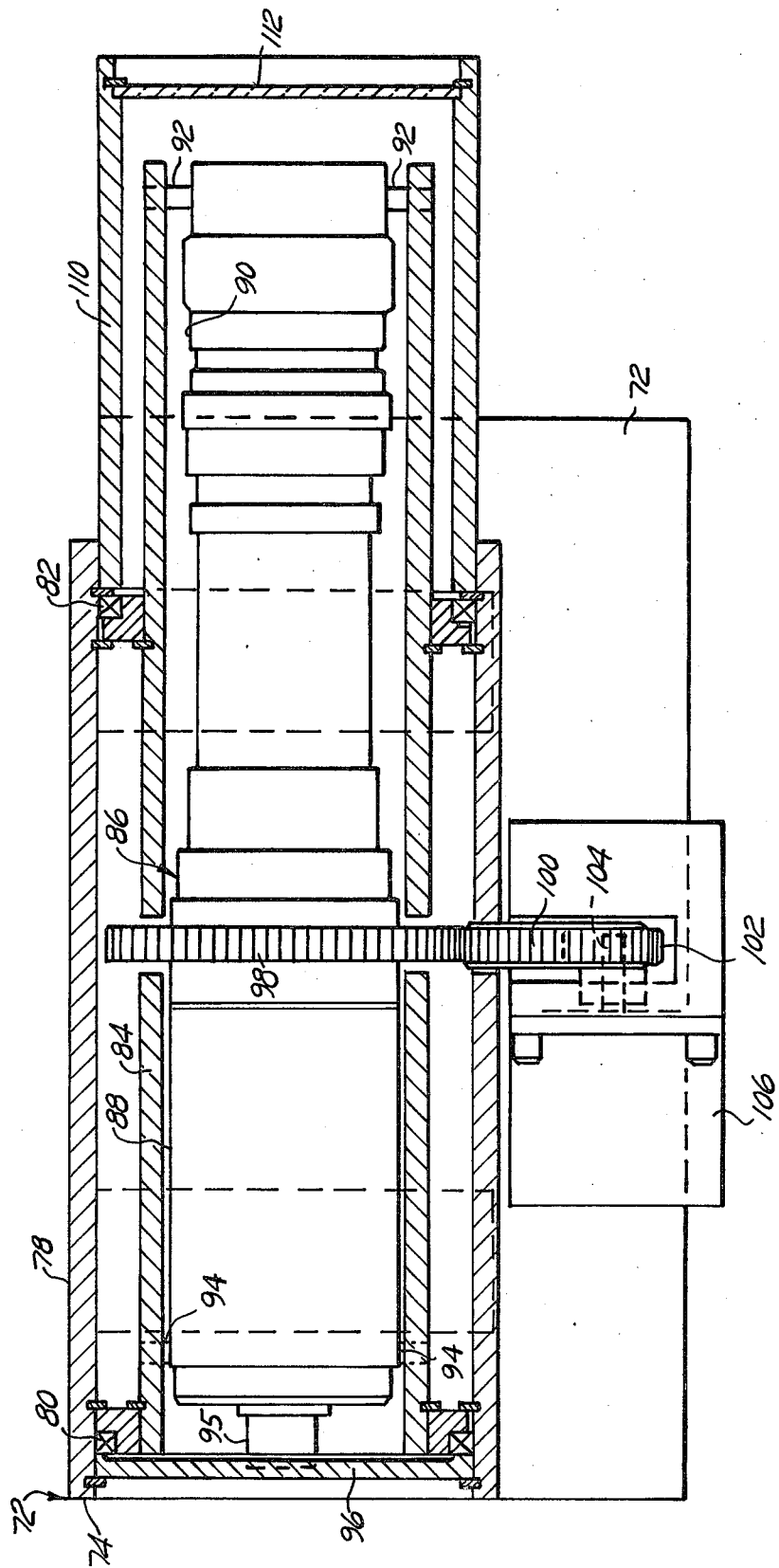
FIG. 2 is an enlarged top plan view of the stepping motor and video camera shown in FIG. 1, but with the video camera housing and its rotation mechanism shown in central horizontal section.
Figure 3:
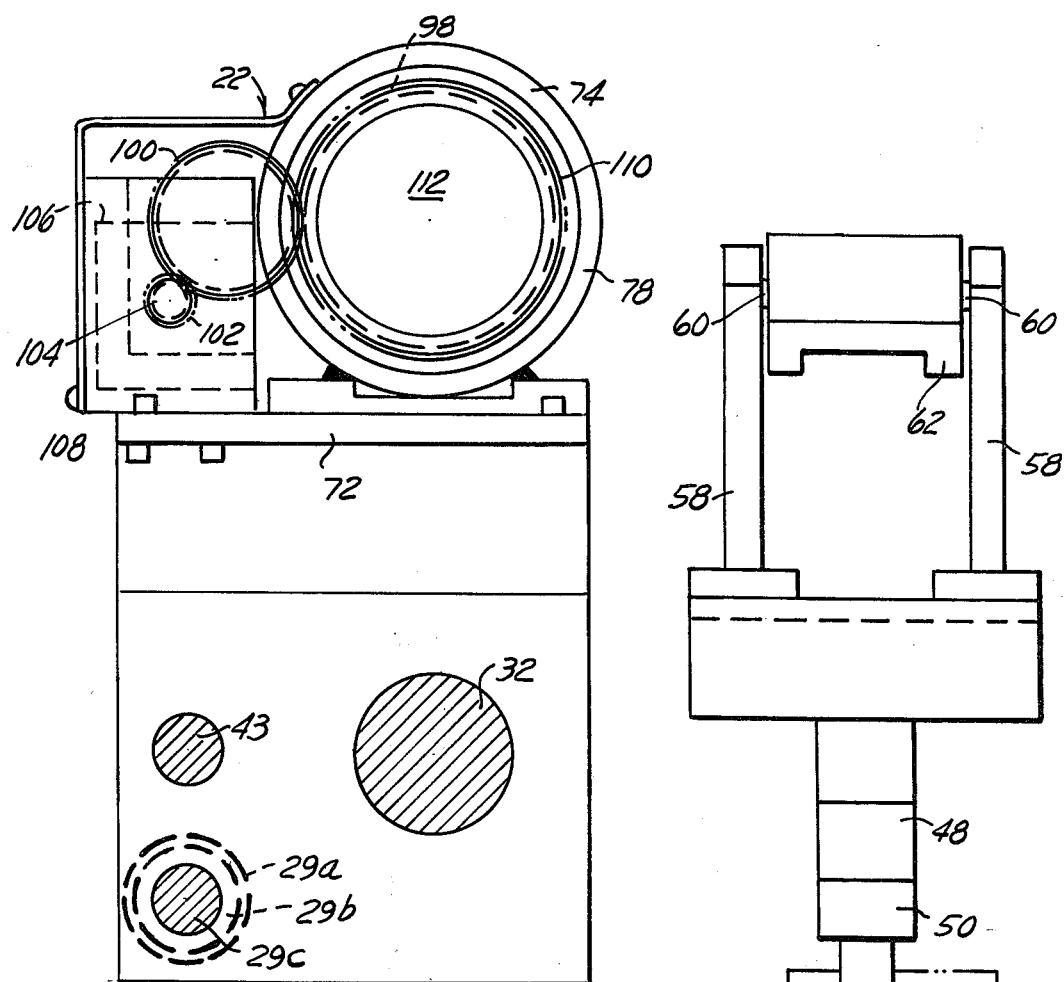
FIG. 3 is a right-hand end elevation, partly in section of FIG. 2, showing the video camera and its rotation mechanism in front elevation.
Figure 4:
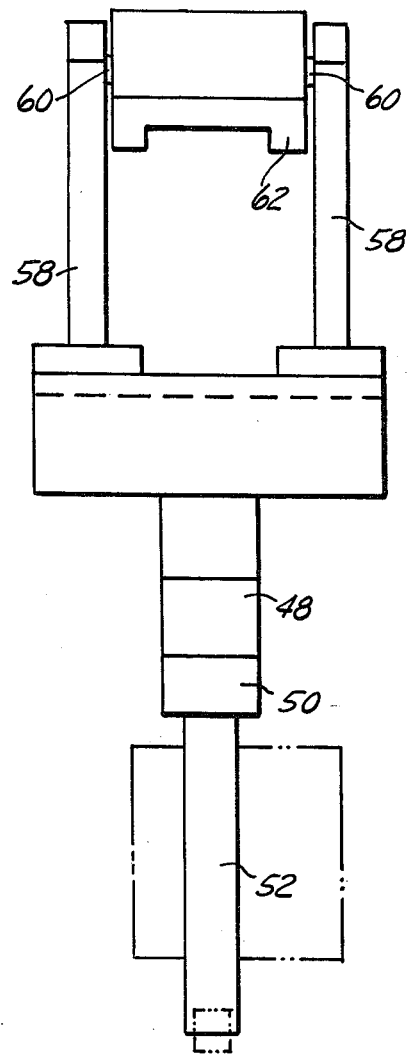
FIG. 4 is an end elevation of the article gripper and reflector shown at the left-hand end of FIG. 1.

The video camera 86 is centered within the inner camera housing 84 by centering screws 92 and 94 at its forward and rearward ends and has a central multiple-terminal connector 95 at its rearward end, the latter being seated within the rearward wall 96 adjacent the rearward anti-friction bearing 80 (FIG. 2). Mounted on the inner video camera housing 84 is a ring gear 98 with which meshes an idler gear 100, in turn with which meshes the output pinion 102 on the output shaft 104 of a camera-rotating stepping-motor 106 which is bolted or otherwise secured at 108 to the base plate or carriage 72. The forward end of the video camera outer housing 74 is closed by a telescoping cylindrical member 110 having a transparent window 112 closing its forward end.

The X-Y positioner 27 upon which the lifting and swinging device 26 is mounted and moved bodliy (FIG. 1) has a base plate or supporting plate 114 to which are secured four upstanding guide rod brackets 116 bored to receive the opposite ends of a pair of longitudinal slide guide rods 118 disposed in spaced parallel relationship. Slidably mounted on the guide rods 118 are two pairs of slide bearing brackets 120 to the upper ends of which is secured a longitudinal or X-axis carriage or slide 122. Mounted midway between the bearing brackets 120 and depending from and secured to the underside of the X-axis table 122 is a bored and internally threaded screwshaft nut bracket 124, the threaded bore 126 of which meshes with the longitudinal screwshaft 128. The forward end 127 of the longitudinal screwshaft 128 is journaled for rotation in an upstanding bearing bracket 130 resting upon and secured to the base plate 114. The opposite or rearward end of the longitudinal screwshaft 128 is journalled at 132 in an upstanding bearing bracket 134 to the outer side of which is secured an X-axis servo motor 136 drivingly connected to the longitudinal screwshaft 128.

Mounted upon and secured to the X-axis carriage or slide 122 are four upstanding slide guide rod brackets 138 in which are mounted the opposite ends of lateral slide guide rods 140 disposed in spaced parallel relationship. Slidably mounted upon the lateral slide guide rods 140 are four slide bearing brackets 142 (only three of which are shown in FIG. 1, the fourth being concealed behind the lifting and swinging device 26). Mounted upon and secured to the upper ends of the slide guide bearing brackets 142 is a lateral or Y-axis carriage or slide 144. The axes of the lateral guide rods 140 are disposed precisely perpendicular to the axes of the longitudinal guide rods 118. Mounted between the forward slide guide rod brackets 138 and secured to the longitudinal or X-axis carriage or slide 122 is an upstanding lateral screwshaft bearing bracket 146 in which the forward end 147 of a lateral or Y-axis screwshaft 148 is journalled for rotation. The opposite or rearward end of the lateral screwshaft 148 is journalled at 150 for rotation in an upstanding bearing bracket 152, to the outer side of which is connected a Y-axis servo motor 154. Secured to and depending from the underside of the lateral or Y-axis carriage or slide 144 immediately behind the bearing bracket 146 similar to the nut bracket 124 containing the threaded bore 126 meshing with the longitudinal screwshaft 128 is a bored and internally threaded screwshaft nut bracket (not shown) containing a threaded bore (not shown) which meshes with the lateral screwshaft 148.

Mounted beneath the path of travel of the gripper head 48 in its extended position (FIG. 1) is an article or workpiece carrier 160, shown for simplicity as a tray with a carrier surface 162 on which the articles such as workpieces W are placed or are conveyed in randomly-arranged positions, and which may be a movable conveyor which is momentarily halted during the scanning action of the rotatable arm-mounted video camera 86. The latter is a narrow-field high-resolution video camera, as stated above, well adapted for the high resolution of small articles or workpieces W.

Mounted above the workpiece carrier 160, as on an L-shaped vertical structure 164 carrying work-illumination lights 165 is a vertical downwardly-directed overhead video camera 166 consisting of a body 168 with a lens 170 having a wider field of view capable of spanning the entire width of the surface 162 of the article or workpiece carrier 160, but with a lower resolution than the arm-mounted video camera 86. The overhead video camera 166 which has been successfully used in the present invention is commercially available as the solid state automation video camera Model TN 2201 also made by the General Electric Company in Syracuse, New York. As supplied to and used in the present invention, the camera body 168 in the focal plane of the lens 170 contains a rectangular picture element array (not shown) having 342 parallel horizontal rows of pixels in 42 vertical columns in an array approximately 0.5 inch or 12.7 millimeters high and approximately 0.067 inch or 1.7- millimeters wide. The overhead camera 166 serves as a finder or locator camera for small articles W, which are precisely positioned by the arm camera 86, in which case the overhead camera 166 is fixed and the arm camera 86 is rotatable. As explained below in a modification of this invention, however, for the scanning of relatively large objects such as metal aircraft panels, where high resolution is not required, the arm camera 86 may be omitted and the overhead camera 166 rotatably mounted on its structure 164.

The lifting and swinging work transfer device 26 as previously stated, is fully disclosed in the Kirsch and Robb U.S. Pat. No. 3,406,837 issued Oct. 22, 1968 and its details are beyond the scope of the present invention. A brief description is therefore believed to be sufficient. The device 26 is housed in a casing 172 with which a base plate 174 is cast integral and has parallel edge slots 176 by which it is bolted to the Y-axis table 144. Also cast integral with the casing 172 is a tangentially-directed vertical plate-shaped boss 178. Bolted to the rearward side of the boss 178 is a reciprocatory pneumatic motor or "air cylinder" 180 supplied with compressed air fittings 182 and 184. The air cylinder 180 contains a piston head (not shown) which actuates a piston rod 186 which passes through the correspondingly bored boss 178 and through a roughly sector-shaped drag link 188, and has a split collar 190 clamped on its forward end within a right-angled recess 192. The drag link 188 and boss 178 are also bored in alignment to reciprocably receive a cushioning piston rod 194 which on its forward end has a split collar 196 clamped thereto within the recess 192.

The rearward end of the cushioning piston rod 194 is connected to a piston head (not shown) within a cushioning cylinder 198, the forward end plate 200 of which is secured to the boss 178 by means of four strain rods 202 threaded into the correspondingly bored and threaded boss 178. The strain rods 202 at their rearward ends pass through a vertically elongated end plate 204 with their hexagonal heads 206 thereby clamping the end plate 204 to the cylinder 198 and the latter in turn to the forward end plate 200. The cylinder 198 contains hydraulic fluid, such as oil, and its piston performs a so-called dash-pot function by forcing the oil through restricted orifice means at the opposite ends of the stroke of the cushioning piston within the cushioning cylinder 198. The elongated end plate 204 also closes the rearward end of a cylindrical oil reservoir 208, the forward end of which is closed by a forward end plate 210, this assembly being held together by strain rods 212 threaded at their forward ends into the forward end plate 210 and passing through correspondingly-bored holes in the rearward end plate 204 to hexagonal rod heads 214. The oil reservoir is connected hydraulically to the cushioning cylinder 198 for supplying oil thereto.

The vertical shaft 25 of the lifting and swinging cylinder 26 passes downward through the upper circular head 216 through a suitable bearing 218 and, as stated in the above-mentioned Kirsch and Robb U.S. Pat. 3,406,837 of Oct. 22, 1968, carries a piston head within the vertical cylinder 172 which is supplied with compressed air in a manner explained in that patent, to cause the piston (not shown) to move the shaft 25 upward and downward. The lower end of the shaft 25 within the vertical cylinder 172 carries a pinion (not shown) which meshes with a toothed rack bar or rod (not shown), the rearward end of which passes through the suitably bored tangential boss 178 and through the drag link 188 and is threaded to receive the so-called Allen screw 220 by which it is secured to the drag link 188. As a consequence, when the piston within the horizontal cylinder 180 is reciprocated by air supplied thereto by the fittings 182 or 184, the drag link reciprocates, carrying with it the rack bar through its connection therewith by the Allen screw 220, reciprocating the rack bar and rotating the gear within the vertical cylinder 172 to rotate the vertical shaft 25 and consequently swing the article pick-up and transfer device 24 through a horizontal arcuate plane.

Figure 7:
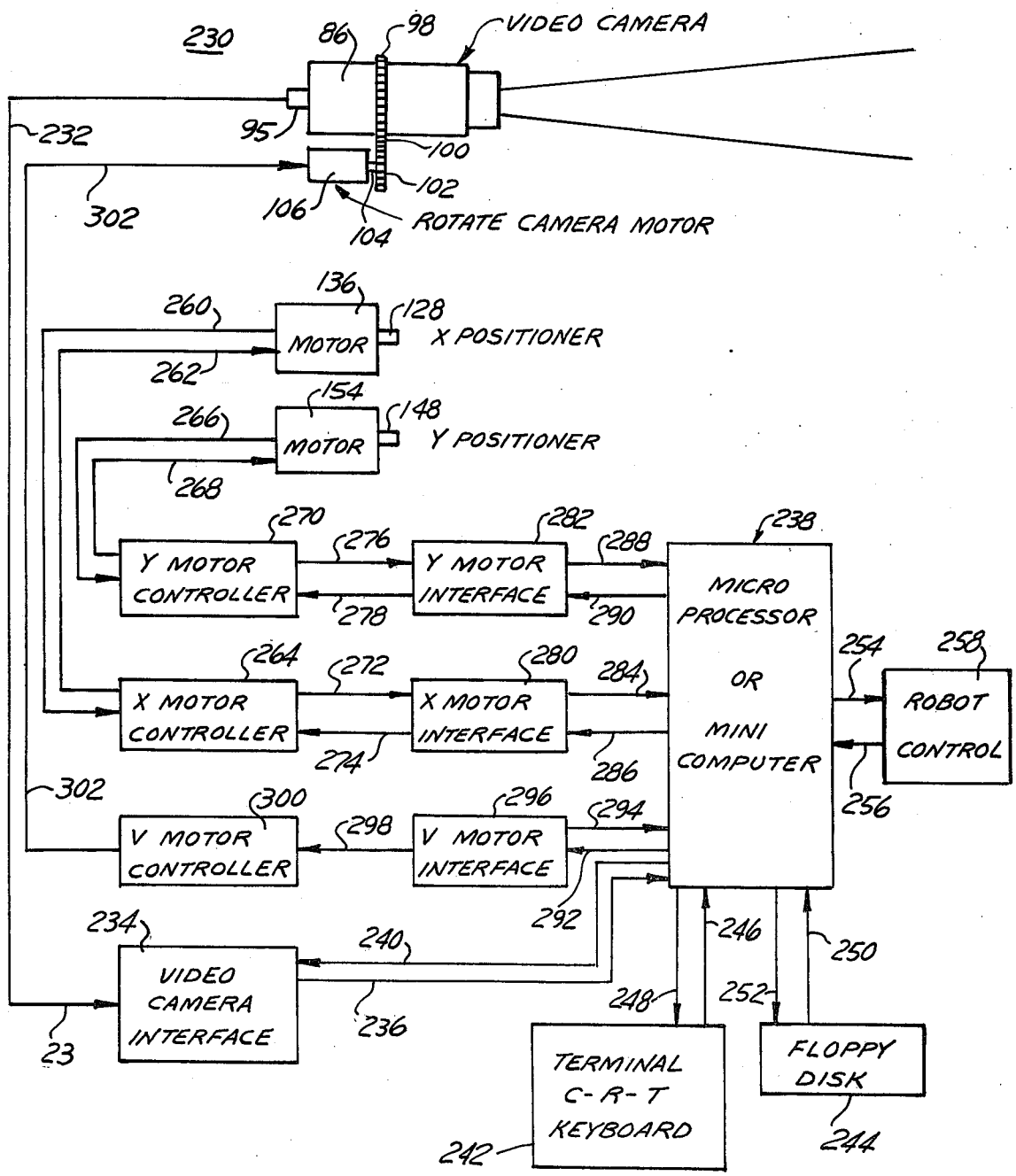
FIG. 7 is a block diagram of the rotary video camera and its computerized rotating and control system, as composed of its various modules, with the signal flow direction shown by arrows.

Computerized Operating System for Rotary Video Article Pickup, Orienting and Transfer Device The video camera rotating and control system, generally designated 230, by which the video camera 86 is rotated and by which the article pickup and transfer attachment 24 and its lifting and swinging article transfer device 26 are directed to the proper location to find the article W and orient its image for comparison with the standard image, is shown generally in the block diagram in FIG. 7. Certain portions of the block diagram of FIG. 7 are further detailed in the subdiagrams of FIGS. 8, 9 and 10 as discussed more fully below. From the rearward end of the video camera 86 signals flow in the direction of the arrow 232 to a video camera interface 234, shown in more detail in FIG. 8. From the video interface 234 signals flow in the direction of the arrow 236 to a conventional minicomputer 238 from which control signals flow to the video interface 234 in the direction of the arrow 240.

The minicomputer 238, also known as a microcomputer or microprocessor, is made up of standard components purchasable on the open market. One that has been successfully employed in this invention is the "IMSAI 8080" Microcomputer manufactured by IMS Associates, Inc., 14860 Wicks Blvd., San Leandro, Cal. 94577. It contains, in addition to its other components, a memory section in which, as will be seen later in the discussion of the operation of the invention, a standard comparison image of a workpiece W properly positioned, centered and oriented upon the workpiece carrier 160 for transfer to the served machine (not shown) has been impressed prior to the use of the invention. Such image impression may be accomplished by area scanning, such as by the actual scanning of a properly positioned article W or by mathematical analysis and impress the image of that article upon the memory section by use of the conventional "C.R.T. terminal" (cathode ray tube terminal) 242 with which the minicomputer 238 is regularly equipped and which includes the usual keyboard for manual impression of the standard workpiece image. Also included as an adjunct to the minicomputer 238 is a so-called "floppydisc" 244 which enlarges the memory section of the minicomputer 238. From the C.R.T. terminal 242 signals flow to and from the minicomputer 238 in the direction of the arrows 246 and 248 and to and from the floppy disc 244 in the directions of the arrows 250 and 252. Also included as an adjunct to the minicomputer 238 with signals flowing in the directions of the arrows 254 and 256 is a robot controller 258 which preferably includes the "block manifold" set forth in the Kirsch U.S. Pat. 3,683,960 issued Aug. 15, 1972 for "Block Manifold for Fluid Control Systems".

The X-axis servo motor 136 and the Y-axis servo motor 154 are conventional and constitute high performance direct current servo motors manufactured by Control Systems Research, Inc. of Pittsburg, Pa., being designated Series S M 700 thereof. The X-axis servo motor 136 has signals flowing in the directions of the arrows 260 and 262 to and from the X-axis motor controller 264, whereas the Y-axis servo motor 154 has signals flowing in the directions of the Arrows 266 and 268 to and from the Y-axis motor controller 270. The X-axis motor controller 264 and the Y-axis motor controller 270 are designated "Index-Syn Series 70" industrial motor controllers made and sold by Control Systems Research, Inc. of Pittsburgh, Pa. and these components for the X-axis and Y-axis servo motors 136 and 154 are the same for both such motors. The X-axis and Y-axis motor controllers 264 and 270 have signals flowing in the direction of the arrows 272, 274 and 276, 278 respectively to and from X-axis and Y-axis motor interfaces 280 and 282 which are also of identical construction and are shown in more detail below in connection with FIG. 10. In turn, the X-axis and Y-axis motor interfaces 280 and 282 have signals flowing in the directions of arrows 284, 286 and 288, 290 respectively to and from the minicomputer 238, as also shown and discussed in connection with FIG. 10.

Figure 8:
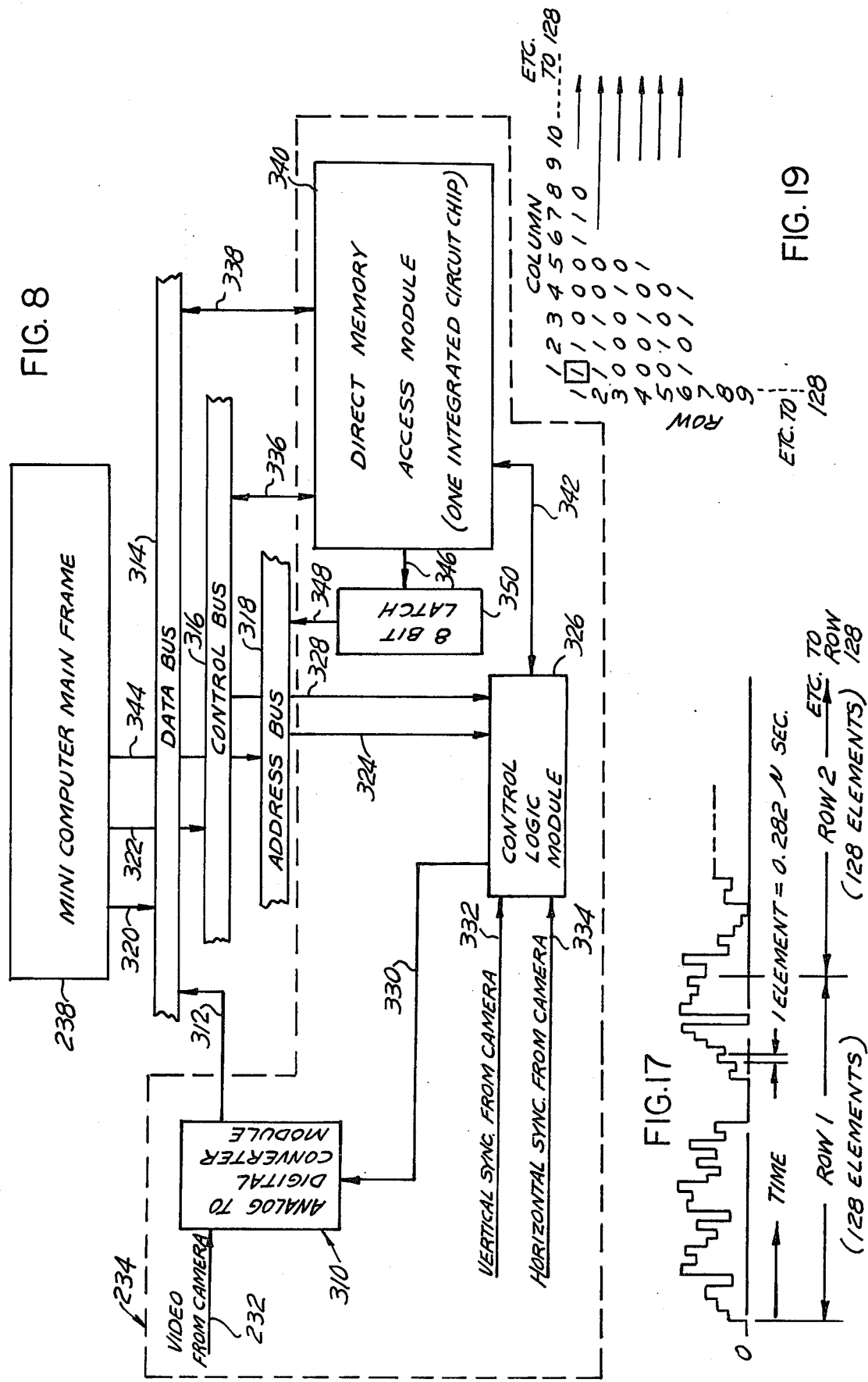
FIG. 8 is a block subdiagram of the various modules which are contained in the video interface shown in the lower left-hand corner of FIG. 7.

The minicomputer 238 has signals flowing in the directions of the arrows 292 and 294 to and from a video camera rotating motor interface 296 which in turn has signals flowing in the direction of the arrow 298 to a video camera rotating motor controller 300 which in turn has signals flowing in the direction of the arrow 302 to the video camera rotating motor 106. The video camera rotating motor interface 296 is shown in more detail in FIG. 9 discussed more fully below. The video camera rotating motor controller 300 as used successfully in this invention is the designated "Slo-Syn Translater Module" manufactured and sold by Superior Electric Company of Bristol, Conn. and available on the open market.

in the video camera interface 234, shown at the lower lefthand corner of FIG. 7 and in more detail within the dashed lines in FIG. 8, signals flowing in the direction of the arrow 232 run to a conventional analog-to-digital converter module 310 (FIG. 8) which is required because, as stated in the manufacturer's instructions for the video camera 86, "Electronics in the camera body perform analog signal derivation functions", whereas the minicomputer 238 requires digital input. Accordingly, the output 312 on the converter 310 runs to the first of the three conductor buses respectively designated a data bus 314, a control bus 316 and an address bus 318. Between the data bus 314 and the minicomputer 238, the doubleheaded arrow 320 indicates the output from the data bus 314 to the minicomputer 238 and signals flowing in the direction from the minicomputer 238 back to the data bus 314. Similarly, the double-headed arrow 322 indicates input to the minicomputer 238 from the control bus 316 and signals flowing in the direction of the minicomputer 238 back to the control bus 316. Signals flowing in the direction indicated by the single-headed arrow 324 proceed from the address bus 318 to control logic circuitry 326 to which similar signal flow indicated by the arrow 328 proceeds from the control bus 316. From the control logic circuitry 326, signal flow indicated by the arrow 330 proceeds to the analog-to-digital converter module 310. Also from the video camera 86, vertical and horizontal synchronization pulses proceed in the directions of the arrows 332 and 334 respectively to the control logic circuitry 326.

Furthermore, in FIG. 8 the double-headed arrows 336 and 338 indicate the directions of signal flow to and from the control bus 316 and data bus 314 respectively to a direct memory access module 340 as well as from the direct memory access module 340 to and from the control bus 316 and data bus 314. Similarly, the double-headed arrow 342 indicates the directions of signal flow to and from the direct memory access module 340 and the control logic circuitry 326 and the direction of signal flow between the latter and the former. Moreover, the single-headed arrow 344 from the minicomputer 238 to the address bus 318 indicates the direction of signal flow from the former to the latter. Finally, the single-headed arrows 346 and 348 indicate respectively the directions of signal flow from the direct memory access module 340 to a conventional 8-bit latch 350 and therefrom to the address bus 318. The term "bus" is used herein as is commonly understood in the electronics industry to refer to a multiple conductor assembly.

In the video camera rotating motor interface 296, shown immediately above and to the right of the video camera interface 234 in FIG. 7 and in more detail within dashed lines in FIG. 9, the data bus 352 (FIG. 9) conveys signals in the directions indicated by its arrow heads between the camera rotating motor interface 296 (FIG. 7) and the minicomputer 238 by way of the single-headed arrows 292 and 294. From the minicomputer 238 (FIG. 9) the address bus 318 and the control bus 316 run to the control logic circuitry 326. From the latter pulses flow in the directions indicated by the arrows 358 and 360 to the motor driver circuit 362, the arrows 358 indicating clockwise rotation pulse flow whereas the arrow 360 indicates counterclockwise pulse flow thereto, A power connection 364 extends between the camera motor power supply 366 and the motor driver circuit 362 from which signal flow indicated by the arrow 368 proceeds to the camera rotating direct current stepping motor 106, the shaft 104 of which rotates the video camera 86 in one direction or the other through the gear train formed by the gears 102, 100 and 98.

Returning to the camera-rotating motor interface 296 (FIGS. 7 and 9), the single-headed arrow 370 indicates the directions of signal flow between the data bus 352 and the control logic circuitry 326. The single-headed arrow 372 indicates the direction of signal flow from the data bus 352 to the presettable 16-bit divide-by-N counter 374. The single-headed arrow 376 indicates the direction of signal flow from the data bus 352 to the presettable 16-bit counter 378 which registers the number of steps. Moreover, the double-headed arrows 380 indicate the directions of signal flow between the counter 374 and the control logic circuitry 326. The double-headed arrows 382 similarly indicate the directions of signal flow between the counter 378 and the control logic circuitry 326. In conclusion, the arrow 384 indicates the direction of signal flow from a clock 386 to the counter 374. The clock 386 serves as a time base for the presettable counter 374.

Figure 10:
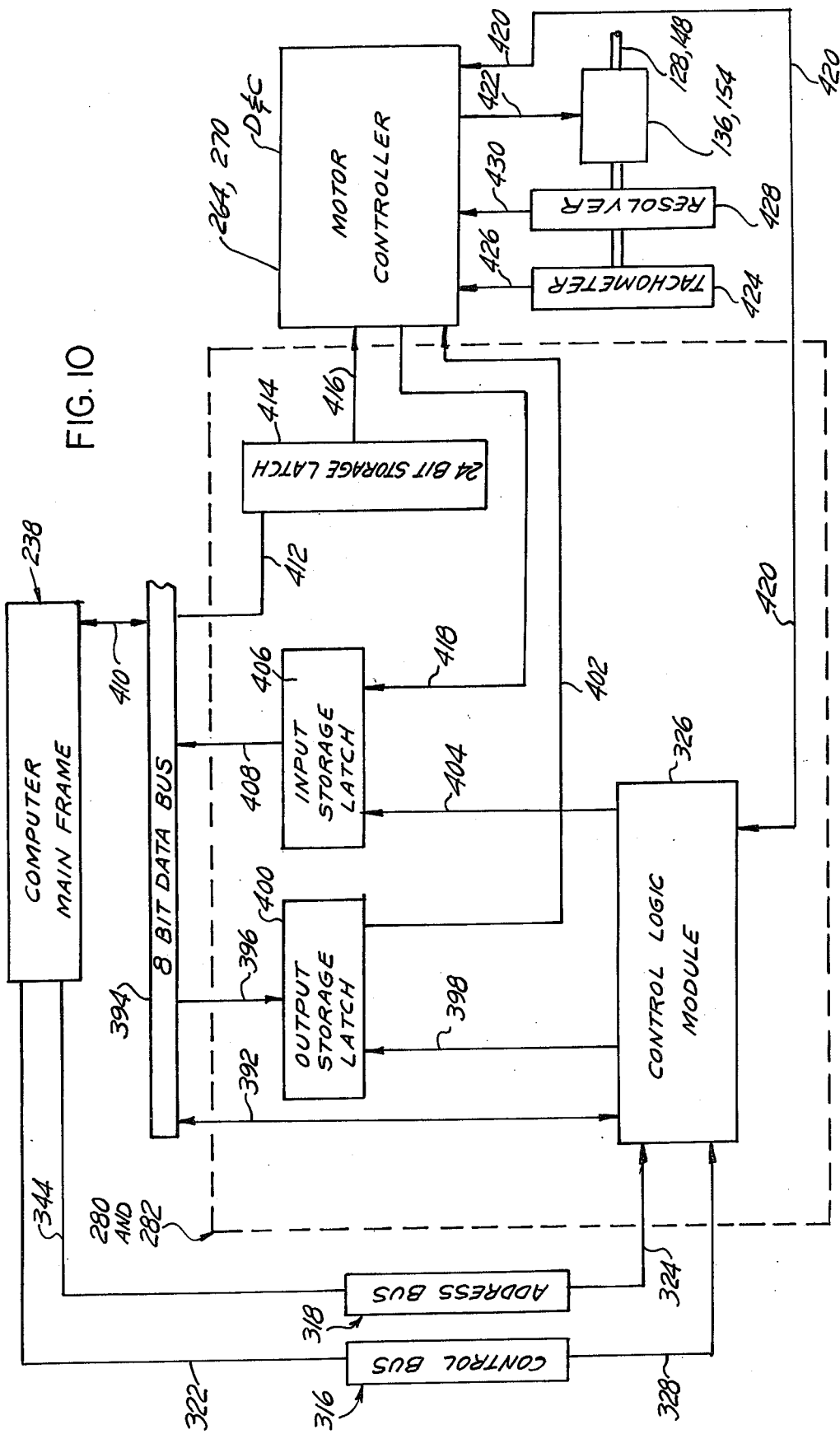
FIG. 10 is a block subdiagram of either one of the identical X-axis or Y-axis motor interfaces shown immediately above the camera-rotating motor module in FIG. 7.

In each of the X-axis and Y-axis motor interfaces 280 and 282 shown in the central portion of FIG. 7 and in more detail in FIG. 10 within the dashed line, from the minicomputer 238 the single-headed arrows 388 and 390 indicate the directions of signal flow between the minicomputer 238 and the control logic circuitry 326. The double-headed arrow 392 indicates the direction of signal flow between the control logic circuitry 326 and an 8-bit data bus 394, whereas the single-headed arrows 396 and 398 respectively indicate the direction of signal flow from the data bus 394 and control logic circuitry 326 to an output storage latch 400 from which the single-headed arrow 402 indicates the direction of signal flow from the output storage latch 400 to the X-axis or Y-axis motor controllers 264 or 270, discussed above. The single-headed arrow 404 indicates the direction of signal flow from the control logic circuitry 326 to an input storage latch 406, whereas the single-headed arrow 408 indicates the direction of signal flow from the input storage latch 406 to the 8-bit data bus 394. The doubleheaded arrow 410 indicates the direction of signal flow between the minicomputer 238 and the data bus 394. The single-headed arrow 412 indicates the direction of signal flow from the data bus 394 to a 24-bit storage latch 414, whereas the single-headed arrow 416 from the latter to the X-axis or Y-axis motor controllers 264 or 270 represents the direction of signal flow from the former to the latter. The single-headed arrow 418 represents the direction of signal flow to the input storage latch 406 from either the X-axis or Y-axis motor controller 264 or 270. Furthermore, the doubleheaded arrow 420 extending between the X-axis or Y-axis motor controllers 264 or 270 indicates the direction of signal flow between the control logic circuitry 326 and the motor controllers 264 or 270. Finally, the single-headed arrow 422 running from the motor controller 264 or 270 to the X-axis or Y-axis motor 136 or 154 represents the direction of signal flow from the former to the latter, thereby governing rotation of their respective shafts 128 or 148 (FIG. 1). Each of these shafts 128 and 148 is drivingly connected to a tachometer 424, the direction of signal flow from which to the motor controller 264 or 270 is indicated by the singleheaded arrow 426. The same shaft 128 or 148 is drivingly connected to a resolver 428, the direction of signal flow from which to the motor controller 264 or 270 is indicated by the single-headed arrow 430.

Operation of the Computerized Electronic Operating Circuit

Prior to the use of the rotary video article centering, orienting and transfer device 20 of this invention, for picking up articles such as workpieces randomly arranged on the work carrier or conveyor 160 and orienting them to the predetermined orientation required for feeding them to a predetermined location, for example, to the dies of a production machine such as a punch press, it is first necessary to so program the memory section of the minicomputer 238 in one of several ways, after the device 20 of this invention has been connected, as explained above, to a computerized operating system 230 including the conventional minicomputer 238 with a memory section. In one way of programming this memory section, a master workpiece W is positioned upon the article or work carrier 160 in the predetermined centration and orientation necessary for feeding it to the production machine or other place of delivery. The horizontal video camera 86 on the robot 24 is then focussed upon said predeterminedly-positioned master workpiece W, said rotary video camera 86 is then rotated by its motor 106 until the image of the master workpiece W is properly centered and oriented in the focal plane of the video camera 86 with its "threshold" or entering edge aligned with the X—X axis of said image plane, whereupon the "pixels" or picture elements in said image plane, reacting to the light-versus-dark contrasts of said workpiece image, transmit the centration and orientation characteristics of said image by feedback through the conventional minicomputer circuit 230 to the memory section thereof and form a memory impression therein for future reference by the horizontal video camera.

In operation, and with the above-mentioned system energized and the randomly-arranged workpieces W on the work carrier 160 and suitably illuminated by the lights 165, the wide-angle lowerresolution overhead video camera 166 is focussed upon the top surface 162 of the work carrier 160 and thus upon a selected workpiece W upon the work carrier 160 beneath it, whereupon its pixels or picture elements are energized and transmit the workpiece image location and orientation through the video interface 234 to the minicomputer 238 for location analysis. The minicomputer 238 then makes a location analysis of the Y-Y coordinates of the selected workpiece W and transits these data in the form of commands to the X-Y axis positioner 27 to bodily move the lifting and swinging device 26 so as to swing the robot 24 over the work carrier 160 and thus bring the selected workpieces W into the field of view of the horizontal narrow-angle higher-resolution video camera 86. The latter, which is then focussed upon the now-illuminated selected workpiece W by light rays therefrom reflected by the reflector 64, transmits the workpiece image data back to the minicomputer 238 with its memory image. The horizontal camera 86 is then commanded to be rotated by its stepping motor 106 (FIGS. 2 and 7) until the leading edge or threshold of the workpiece image (FIG. 12) becomes aligned with the X-axis and oriented and centered in the image plane of the camera. Thereupon the motor 29a now moves the extensible arm 32 longitudinally to bring the gripper 23 over the workpiece W. The gripper stepping motor 38 is then commanded to rotate the gripper head 48 until its gripping fingers 52 are aligned with the opposite sides of the workpiece. The minicomputer 238 then energizes a solenoid valve (not shown) to supply air to the robot controller 258, whereby the lifting and swinging motor 26 then causes the robot 24 with its camera 86 and its gripping fingers 52 to descend. Meanwhile, the air motor 56 on the arm 32 in response to the robot controller 258 causes these fingers 52 which are normally open to close upon the opposite sides of the selected workpiece W, whereupon the lifting and swinging motor 26 is commanded by the minicomputer 238 to cause the arm 32 and the workpiece W now carried by it to rise.

Summarizing the foregoing actions, the horizontal video camera 86 finds and transmits to the memory section of the minicomputer 238 the coordinates of the workpiece W which the minicomputer 238 then compares with the therein-stored image of the master workpiece in its proper orientation and centration, and rotates in response thereto until the image of the workpiece W which it holds has been rotated by the latter's stepping motor 38 and centered by the motions of the X-axis and Y-axis carriages 122 and 124 by their motors 136 and 154 until the orientation and centration thereof coincide with that of the memory image. Thereupon the rotation of the workpiece W is halted, having reached its proper orientation for delivery into the place of delivery, such as a production machine.

In response to the action of the pre-set robot controller 258, the robot 24 now swings over to the production machine or other place of delivery and into its operating zone, whereupon the workpiece gripper 23 is rotated to the predetermined delivery position of its fingers 52, so that the lifting and swinging motor 26 causes the now properly oriented workpiece W to descend into its proper position of delivery, such as in the production machine, and the air motor 56 is then commanded to cause the fingers 52 to release their grip upon the workpiece. The lifting and swinging motor 26 then raises the robot 24, the workpiece gripper 23 and the gripping fingers 52 carried thereby, whereupon the robot 24 swings back to its starting position, ready to pick up, orient, center and transfer the next workpiece from the work carrier 160 in the same manner, and the air controls associated with the robot controller 258 are reset for anotheroperaing cycle.

Shown diagrammatically in FIG. 11 is the greatly enlarged array 400 of picture elements in horizontal rows 442 and vertical columns 444. Scanning, during operation, takes place starting at the origin 446 in the upper left-hand corner and proceeding downward. The center lines 450 horizontally and 452 vertically intersect at 454. Shown in solid lines at 456 is the image of a rectangular object received from the memory section of the minicomputer 238 to which is to be compared the oblique dotted line image 458 of an article or workpiece W on the work carrier 160, where the image 458 was originally centered at the intersection 460 of horizontal and vertical cross lines 462 and 464 representing the X-axis and Y-axis coordinates respectively. FIG. 11 shows that the article image 458 which was originally centered at 460 has been shifted in X-axis and Y-axis directions by the motions of the X-Y positioner 27 to coincide with the center 454 of the standard or master image 456 received from the said memory section. The video camera 86 then rotates until the previously oblique workpiece/image 458 coincides with the master workpiece image 456 and is also centered therewith, whereupon the workpiece is ready to be transferred to its destination.

Shown diagrammatically in FIG. 12 is the image 466 of a more complex workpiece consisting of a Vee-block wherein the workpiece image 466 has been brought into coincidence with the master workpiece image from the memory section of the minicomputer 238, and the gripper fingers 52 are ready to grasp the workpiece W. In FIG. 12, as the video camera 86 scans the workpiece, its threshold 468 represented by the vertical line encounters the workpiece at the points 470 amd 472 when the video camera 86 has been properly rotated. As the threshold 468 proceeds from left to right, the image 466 becomes fully developed upon the array 474 of picture elements, scanning as before beginning in the upper lefthand corner at 476 and proceeding downward and to the right therefrom. It will be understood that a video monitor can be connected into the video camera circuit to indicate the successive X and Y coordinates of the image as scanning takes place and proceeds until the image 466 is completely developed upon the array 474. By the X-Y axis motion of the X-Y positioner 27 with the rotation of the video camera 86, the workpiece image 466 is brought into coincidence with the master workpiece image and centered therewith at the intersection 478 of the cross lines 480 and 482. FIG. 12 thus shows the behavior of the invention when the entering edges 484 and 486 are re-entrant by converging inward toward a meeting point 488. A similar action would occur in the case of a heartshaped workpiece.

FIGS. 13 to 16 show the four positions of a headed workpiece, such as the image 490 of a screw having a shank 492 terminating in an enlarged head 494. In FIG. 13, the screw image 490 is shown as both properly oriented and centered at 496, such as would be the preimpressed image of a properly centered and oriented master workpiece in the memory section of the minicomputer 238. In FIG. 14, the image 498 of the same screw is shown as properly oriented but not centered, so that further action of the X-Y axis positioner 27 is necessary to bring the image 498 of FIG. 14 into the condition of the image 490 of FIG. 13. In FIG. 15, the image 500 of the same screw is shown as centered at 496 but inclined obliquely, so that further action of the rotatable video camera 86 is required to properly orient it, as shown by the image 490 in FIG. 13. In FIG. 16, the image 502 of the same screw is shown as neither centered nor properly oriented. Furthermore, the screw in FIG. 16 is also inverted as well as its image being decentered and oblique. Consequently, the action of the X-Y positioner 27 is required to center the image 502 into proper orientation shown by the image 490 in FIG. 13.

It will be understood by those skilled in the video camera art of the type utilized in this invention that such a camera distinguishes between the darkness and darkgrayness of the workpiece W and the lightness or lightgrayness of the background 162 at the boundary or boundaries therebetween formed by the edge or edges of the workpiece W. Without the rotation of the video camera 86 independently of the robot 24 on which it is mounted as well as independently of the rotary workpiece gripper 23, according to the present invention, the computer would be required to perform workpiece recognition by multiple diagonal scans by the video camera and/or the performing of complex trigonometric computations, either or both of which would involve a great amount of program development time eliminated and avoided by the present invention.

The advantages just described are also obtained in the above-described modification of the present invention when, for large workpieces not requiring high resolution in the video camera, the low-resolution wide-angle overhead video camera 166 is pivotally mounted and made to be revolved by a motor with circuitry analogous to that described for the robot-mounted video camera 86, whereupon one of the video cameras, such as the video camera 86, can be dispensed. This is described in more detail below.

Describing the construction and operation of the invention in more detail, the video camera 86 emits information by means of analog steps in a string. Each step has an equal time base (0.282 micro-seconds) with a variation in voltage magnitude from zero to 1 volt proportional to light input to the video camera picture element or "pixel" array. These steps are emitted in the output of the camera back to back. These come out in a string corresponding to rows back to back (FIG. 17). As stated above, the analog output from the video camera 86 is then digitized through the use of the conventional analog-to-digital converter (A.D.C.) 310. This process splits the voltage levels into levels of light, or rather shades of gray. Generally, if the workpiece W being observed is different in shade from the background 162 the transition is made only once, calling voltage levels above the transition level white and below, dark. The purpose of digitizing the signal is to make it compatible with the memory section of the computer or microprocessor 238 memory and with the digital circuitry. The result of digitizing the signal into two levels is shown in FIG. 18.

The signals above are interpreted by the computer as binary numbers 1 or 0 for each picture element (pixel). This string of elements, now binary numbers, is loaded into the computer memory. The memory is in the form of a numerical array, the same numerically as the array of the video camera 86. An example of this is shown in FIG. 19 where 1 represents a white portion corresponding to the presence of the workpiece and 0 represents a black portion corresponding to the absence of the workpiece at the respective points.

Now that the analog output of the video camera 86 has been digitalized and transmitted to the computer or microprocessor 238, the image of the workpiece W is represented as an array of elements similar to the array in the camera. The array of memory can be scanned by a simple program in the same way information is taken into memory, row by row.

Example:
    C=column    Array: A (R,C,)
    R=row
    For C=pixels 1 to 128
    For R=pixels 1 to 128
    Area—Area+A(R,C)
    Next R
    Next C
    Print "Area"=Area
    Stop The above program sums the number of memory locations with the number 1, vs. the number zero. This is proportional to the amount of white in the image.

To recognize a workpiece W and its orientation by conventional means has hitherto required a long program with different scanning directions and a multitude of decisions which have had to be made by the computer. A principal object of the present invention is to simplify this programming by rotating the video camera array such that one condition is met upon examination. The orientation of the video camera 86 is known by servo feedback from the camera-rotating motor 106 or, in the case of stepping motors, the number of steps is known at this position relative to a "zero" position and the angle of rotation can be calculated therefrom.

The process of checking is controlled by the computer in a series of cycles involving a turn-look-compare sequence until a condition is met. The condition which will define orientational alignment will be decided upon when peculiarities of the part are observed. Examples of these peculiarities have been given in FIGS. 12 to 16 and described above in connection therewith. Note that the workpiece thereon need not be centered in order to be rotationally aligned.

The method of analysis of the workpiece for the cameras can be accomplished in several ways depending upon the nature of the workpiece involved. With some workpieces it may be useful to take the digital information from the camera and store the video camera image of a properly-positioned workpiece in the memory section of the computer for subsequent scanning by the computer. With other workpieces, it may only be necessary to use hardware consisting of clocks and counters to measure the workpiece position, area, height and width. In the case of the rectangular workpiece of FIG. 11, the workpiece can be aligned first by rotating the camera until the first line in which the image 458 of the workpiece is encountered contains a predetermined number of picture elements excited by the existence of the workpiece. This insures that the leading edge of the workpiece in the top of the frame will be parallel to the rows of picture elements in the camera. It is not necessary that the workpiece be centered in the array to perform this type of assurance that alignment is correct because this can happen only in one position of rotation. The specially designed fingers 52 can then pick up the workpiece.

With the understanding of the above examples one can see the importance of the rotating arm-mounted video camera. It provides for extended usage of relatively simple analysis. The height and width check, for example, can be adapted to nearly all simple parts by a parameter change in the program as well as necessary hardware changes in the gripping fingers to fit the particular workpiece. One very important method of programming is what may be called the "area difference technique". By taking a workpiece during initial set-up and placing it on the examination stage, one can call upon a centering subroutine to center the part. One can rotate the part by hand until it is in alignment compatible with the gripper 23 for pick-up by the gripper fingers 52.

When the workpiece W has been centered and aligned, the computer receives the input of the data as previously described and stores it in a so-called "floppy-disc" for future reference. In operation, the properly oriented and centered image is brought into the working memory of the minicomputer. The workpiece W which is randomly positioned on the workpiece carrier 160 is then centered by the area technique. Once centered, the arm-mounted camera is incrementally rotated and the image is stored in the memory section of the microcomputer 238. The memory image is then subtracted numerically from the image of the properly positioned previously impressed workpiece, element by element. The object here is to minimize the difference to find the proper orientation.

Once the part is centered, the camera picture is compared in memory with that of the centered part. The camera is not rotated until the overall height is equal to a set parameter, such as the height of the workpiece 500 in FIG. 14. At this point the width of the workpiece 500 is checked at a certain distance from the top of the screw head. If this dimension is too small, then the workpiece is considered to be 180° inverted, as shown in FIG. 16. At this point, the analysis is repeated to re-center the aligned workpiece if necessary. It should be noted that rotational alignment does not require the workpiece to be centered.

In the case of the "V-block" 466 of FIG. 12, centering can be accomplished as in the case of the screw of FIGS. 13 to 16. Rotational alignment is accomplished by incrementally rotating the camera and scanning columns first row-by-row. When the workpiece 466 is first encountered as at 470 in FIG. 12, the workpiece 466 must be re-encountered in the same column as at 472 after a void of a predetermined number of elements. This provides for positive alignment. When alignment is completed, the workpiece can be centered through the use of counters. Picture elements are counted until the workpiece is encountered. Due to the fact that the upper left-hand corner 470 (FIG. 12) will be encountered first, the counters will stop and the position of the workpiece 466 then be known and compensated for. The workpiece is now in a known orientation and available for pick-up. Another means of alignment of a rectangle or square 458 (FIG. 11) is to minimize the overall height by rotating the camera 86.

With more complicated parts such as the socket cap screw (FIGS. 13 to 16), it may prove to be simpler to store the output of the camera picture elements in memory locations. The camera analog signal is digitized and stored as numbers in separate memory locations. In most cases two levels of light are all that are needed, so that a threshold, or point of crossover, will be set at a gray level so that the portion which may be light in color will regiater a "1" and the background, usually dark, will register a "0". Some applications could also conceivably require more levels where different shades of gray or colors are involved. For these cases, the picture elements can be broken down into 4, 8, 16 or 32 levels of gray and processed as such. Once in memory as numbers, the picture, or segments of the picture, are easily scanned by the computer program and decisions made upon the results. In the case of the screw in FIG. 13, the screw can be centered by matching the areas in the four quadrants divided from another by the major axes which bisect the array of picture elements. By setting the constraint or limiting condition that non-adjacent quadrants must have equal areas of the part in view, or areas to each side of them must be equal, it can be calculated by the differences how much movement is required to center the workpiece (FIG. 15).

FIG. 20 shows in perspective a modified rotary video article centering, orienting and transfer device, generally designated 520, which may be considered as the stationary overhead vertical video camera 21 of FIG. 1 and the horizontal arm-mounted video camera 22 of the same figure replaced by the X-Y positioner shown at 27 in the lower half of FIG. 1 but inverted and placed overhead away from the lifting and swinging article transfer device 28 and with the video camera pointing downward and made rotatable. The overhead supporting structure corresponding to the L-shaped vertical structure 164 has its overhead structure and its work-illumination lights 165 omitted to simplify the showing and prevent concealment of parts which would otherwise be hidden. Since, except for the above-mentioned inversion, the X-Y positioner is substantially the same as that shown in FIG. 1, the same reference numerals have been employed for corresponding parts, and further detailed description is not deemed necessary, except for the additional features not shown in FIG. 1, but shown in FIG. 20.

In particular, FIG. 20 shows a supporting plate 114 from which depend four Y-slide upper guide rod brackets 116 holding the opposite ends of a pair of upper Y-axis slide guide rods 118 which in turn slidably support Y-axis slide upper bearing brackets 120 carrying the Y-axis upper carriage or slide 122 to which is secured the threaded Y-axis nut bracket 134 moved to and fro by the Y-axis upper screw shaft 128 rotated by the Y-axis upper servo-motor 136. The Y-axis carriage or slide 122 carries four X-axis slide guide rod brackets 138 holding the opposite ends of lateral X-axis slide guide rods 140 upon which four X-axis slide bearing brackets 142 support a lower X-axis carriage or slide 144 disposed perpendicular to the axes of the Y-axis slide guide rods 118. Secured to and rotatably mounted on the Y-axis upper carriage or slide 122 is an X-axis lower screw shaft 148 rotated by an X-axis lower servo-motor 154 which moves the X-axis lower carriage 144 to and fro by means of a threaded X-axis screw shaft nut bracket 155 meshing with the X-axis screwshaft 148.

The modified rotary video article centering, orienting and transfer device 520 on the lower X-axis carriage or slide 144 rotatably supports a rotary video camera table 522 which is externally-toothed to be rotated by a meshing pinion (not shown) on a shaft 524 driven by a table rotating servo-motor 526. Mounted on the X-axis lower carriage or slide 144 and secured to and depending from the rotary video camera table 522 is a video camera 528 which is focussed upon a work table 530 corresponding to the article or workpiece carrier 160 in FIG. 1 such as a tray and which, like the article or workpiece carrier 160 may be a movable conveyor which is momentarily halted during the scanning action of the rotatable overhead vertical video camera 86 of FIG. 1 for article or workpieces which are sufficiently large to be accurately positioned and sufficiently resolved by the video camera 528. It will be understood, however, that for very small workpieces W which are not positioned with sufficient accuracy by the resolving power of the overhead video camera 528, the latter may be supplemented by a horizontal robot arm-mounted video camera 86 similar to that shown in FIG. 1. It will also be understood that the video camera 528 instead of being provided with the usual objective lens 532 may be equipped with a conventional "zoom lens" (not shown) wherein optical elements of the lens system within the lens mount can be moved back and forth relatively to one another by motor-driven mechanism such as gearing driven by an electric motor to vary the size of the image of the workpiece W and consequently vary the resolving power of the lens. Such a lens which has been successfully used by the present inventor is the zoom lens manufactured in Japan by the Canon Camera Company and sold under the name "Canon" in the United States by Canon U.S.A. Inc., 10 Nevada Drive, Lake Success, N.Y.

We claim:

1. A rotary video article centering, orienting and transferring machine adapted to be installed in a computerized electronic operating and control system with a memory section therein and operable to transport articles from a loading station to an unloading station outside said machine, said machine comprising
   an article carrier disposed at the loading station,
   a machine-supporting structure adapted to be disposed between said stations,
   a first X-Y axis positioner including
      a first X-axis carriage mounted on said structure for horizontal reciprocation longitudinally of said article carrier and
      a first Y-axis carriage mounted on said X-axis carriage for horizontal reciprocation laterally of said X-axis carriage,
   means for so reciprocating said first X-axis and said first Y-axis carriages,
   a lifting and horizontally swinging device mounted on said first Y-axis carriage,
   an article transporter mounted on said device for lifting and swinging thereby and having an article gripper connected thereto and movable thereby between the loading and unloading stations,
   a first video camera mounted in optical alignment with said article carrier for rotation around its optical axis and having a focal plane disposed in focus with said article carrier for imaging articles thereon in said focal plane,
      said first video camera having means thereon adapted for the electrical connection thereof to the computerized electronic operating and control system for transmitting the image of a randomly-positioned article on said carrier in said focal plane to the operating and control system for comparison with the image of a previously-properly-positioned article on said article carrier previously recorded in the memory section,
   and means responsive to the bringing of the video camera image of the randomly-positioned article on said workpiece carrier into coincidence with the image in the memory section of the computerized electronic operating and control system for rotating said first video camera and moving said X-axis carriage and said Y-axis carriage to move said article gripper into a position adjacent the randomly-positioned article for pickup thereof.

2. A rotary video article centering, orienting and transferring machine, according to claim 1, wherein said first video camera is mounted on and movable bodily with said article transporter.

3. A rotary video article centering, orienting and transferring machine, according to claim 1, wherein said article transporter has a rearward portion mounted on said lifting and swinging device, also has an extensible forward portion movably mounted on said rearward portion, and also has means connected to said rearward portion for extending and retracting said forward portion relatively to said rearward portion, said article gripper being mounted on said forward portion.

4. A rotary video article centering, orienting and transferring machine, according to claim 3, wherein said first video camera is mounted on said rearward portion, and wherein said forward portion has reflecting means thereon in optical alignment with said video camera and the loading station.

5. A rotary video article centering, orienting and transferring machine, according to claim 3, wherein said forward portion is mounted on said rearward portion coaxial therewith for rotation relatively thereto, and wherein means are mounted on said rearward portion and operatively connected to said forward portion for rotating said forward portion relatively to said rearward portion.

6. A rotary video article centering, orienting and transferring machine, according to claim 3, wherein said article gripper is rotatably mounted on said forward portion, and wherein means is provided for rotating said article gripper.

7. A rotary video article centering, orienting and transferring machine, according to claim 6, wherein said article gripper rotates upon an axis substantially perpendicular to said forward portion.

8. A rotary video article centering, orienting and transferring machine, according to claim 6, wherein said article gripper is mounted on said article transporter for rotation independently of the swinging of said transporter.

9. A rotary video article centering, orienting and transferring machine, according to claim 4, wherein said first video camera is disposed with its optical axis parallel to said article transporter and perpendicular to the axis of swing of said transporter.

10. A rotary video article centering, orienting and transferring machine, according to claim 1, wherein a second camera supporting structure is disposed adjacent the loading station, and wherein a second video camera is disposed with its optical axis substantially perpendicular to the loading station.

11. A rotary video article centering, orienting and transferring machine, according to claim 10, wherein said first video camera has a narrow-angle high resolution objective lens covering only a fractional part of the loading station width, and wherein said second video camera has a wide angle lower resolution objective lens covering substantially the entire width of the loading station, said second video camera having means thereon adapted for electrical connection thereof to the operating and control system and to said first video camera for moving said X-axis carriage and said Y-axis carriage to move said article transporter and said first video camera thereon to bring the field of view of said first video camera into covering relationship with said randomly-positioned article in response to the locating of said randomly-positioned article and the determination and transmittal of the X-axis and Y-axis coordinates to said first video camera by way of the operating and control system and the feedback therefrom.

12. A rotary video article centering, orienting and transferring machine adapted to be installed in a computerized electronic operating and control system with a memory section therein and operable to transport articles from a loading station to an unloading station outside said machine, said machine comprising a machine-supporting structure adapted to be disposed between said stations, a first X-Y positioner including a first X-axis carriage mounted on said structure for horizontal reciprocation longitudinally of said article carrier and a first Y-axis carriage mounted on said X-axis carriage for horizontal reciprocation laterally of said X-axis carriage, means for so reciprocating said first X-axis and said first Y-axis structures, a lifting and horizontally swinging device mounted on said first Y-axis carriage, an article transporter mounted on said device for lifting and swinging thereby and having an article gripper connected thereto and movable thereby between the loading and unloading stations, an overhead video camera supporting structure disposed above the loading station, a second X-Y axis positioner mounted on said overhead video camera supporting structure above said article carrier, a rotary video camera support rotatably mounted on said second X-Y axis positioner for horizontal reciprocation therewith in mutually perpendicular directions relatively to said overhead camera supporting structure, and an overhead video camera mounted on said rotary camera support with its optical axis substantially vertical and substantially coincident with the axis of rotation of said rotary camera support, said overhead video camera having a focal plane disposed in focus with said article carrier for imaging articles thereon in said focal plane, said overhead video camera having means thereon adapted for the electrical connection thereof to the computerized electronic operating and control system for transmitting the image of a randomly-positioned article on said carrier in said focal plane to the operating and control systems for comparison with the image of a previously-recorded in the memory section, and means responsive to the bringing of the overhead video camera image of the randomly-positioned article on said workpiece carrier into coincidence with the image in the memory section of the computerized electronic operating and control system for rotating said overhead video camera and moving said first X-axis carriage and said first Y-axis carriage to move said article gripper into a position adjacent the randomly-positioned article for pickup thereof.

* * * * *